United States Patent [19]

Burgess

[11] Patent Number: 4,755,682
[45] Date of Patent: Jul. 5, 1988

[54] IONIZATION MONITOR WITH IMPROVED ULTRA-HIGH MEGOHM RESISTOR

[75] Inventor: Edward T. Burgess, Carlisle, Ohio

[73] Assignee: The United States of America as represented by the United States Department of Energy, Washington, D.C.

[21] Appl. No.: 916,345

[22] Filed: Oct. 7, 1986

[51] Int. Cl.⁴ .............................................. G01T 1/185
[52] U.S. Cl. .................................... 250/374; 250/381; 250/382
[58] Field of Search ....................... 250/382, 374, 381; 338/308

[56] References Cited

U.S. PATENT DOCUMENTS

| | | | |
|---|---|---|---|
| 2,965,847 | 12/1960 | Radley | 250/382 |
| 3,521,263 | 7/1970 | Lampart et al. | 340/629 |
| 3,946,374 | 3/1976 | McMillian et al. | 250/381 |
| 3,959,653 | 5/1976 | Lee et al. | 250/374 |
| 4,012,729 | 3/1977 | Weaver et al. | 250/381 |
| 4,044,263 | 8/1977 | Ried, Jr. et al. | 250/381 |
| 4,081,684 | 3/1978 | Wieder | 250/381 |
| 4,243,981 | 1/1981 | Beyersdorf | 250/381 |
| 4,258,261 | 3/1981 | Conforti | 250/381 |
| 4,286,160 | 8/1981 | Ried, Jr. | 250/381 |
| 4,336,454 | 6/1982 | Bryant et al. | 250/381 |

Primary Examiner—Janice A. Howell
Assistant Examiner—William F. Rauchholz
Attorney, Agent, or Firm—George H. Libman; James H. Chafin; Judson R. Hightower

[57] ABSTRACT

An ionization monitor measures extremely small currents using a resistor containing a beta emitter to generate ion-pairs which are collected as current when the device is used as a feedback resistor in an electrometer circuit. By varying the amount of beta emitter, the resistance of the resistor may be varied.

7 Claims, 4 Drawing Sheets

IONIZATION MONITOR WITH IMPROVED ULTRA-HIGH MEGOHM RESISTOR

The United States Government has rights in this invention pursuant to Contract No. DE-AC04-76DP00053 between the Department of Energy and Monsanto Research Corporation.

BACKGROUND OF THE INVENTION

The present invention relates generally to an ionization monitor and more particularly to an ionization monitor having an improved very high megohm value resistor.

Ionization monitors are used to detect the presence of low levels of radioactivity in gas streams. Such monitors may include a counting chamber for containing the gas under test, such as a pipe through which the gas is constantly flowing. If ionizing radiation is present, ionic and electronic currents are caused to flow between a counting electrode and the wall of the chamber.

The problem solved by this invention is the measurement of these extremely small currents. Ionization monitors may include an electrometer circuit including 100% negative feedback for amplifying these currents and converting them to measureable voltages. The negative feedback is typically provided by a resistor, a device that linearly converts current to voltage. Unfortunately, for measurement of currents on the order of a few electrons per second, a very high impedance resistor is needed.

Conventional high impedance resistors are made of composites including carbon. These resistors provide a maximum resistance on the order of $10^{14}$–$10^{15}$ ohms, a value too low to enable the detection of extremely low samples of radioactivity in a gas. Accordingly, the invention was developed to provide a maximum resistance on the order of $10^{17}$–$10^{18}$ ohms to permit the detection of as little as 1 radioactive event per second in a gas sample.

SUMMARY OF THE INVENTION

It is an object of this invention to provide a very high value resistor in combination with an ionization monitor to permit the detection of very low occurrences of radioactive disintegrations in a gas.

It is another object of this invention to provide a very high resistor in an ionization monitor, the impedance of the resistor being variable.

Additional objects, advantages and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise an ionization monitor having a counting chamber including an electrode connected to the input of an electrometer circuit. The output of the electrometer circuit is fed back to the input through the resistor of this invention comprising a pair of spaced electrodes, the electrode connected to the output being coated with a weak radioactive beta emitter such as carbon-14. As current in the counting chamber as the result of radioactive events attempts to drive the input of the electrometer circuit negative, the voltage difference across the resistor causes sufficient ionization in the resistor to bring the input voltage back to a starting value. Because of the extremely high impedance of the resistor, the voltage across the resistor can be read, providing an indication of radioactivity in the counting chamber.

BRIEF DESCRIPTION OF THE DRAWINGS

The accompanying drawings, which are incorporated in and form part of the specification, illustrate an embodiment of the present invention and, together with the description, serve to explain the principles of the invention

DETAILED DESCRIPTION OF THE INVENTION

Figure 1:
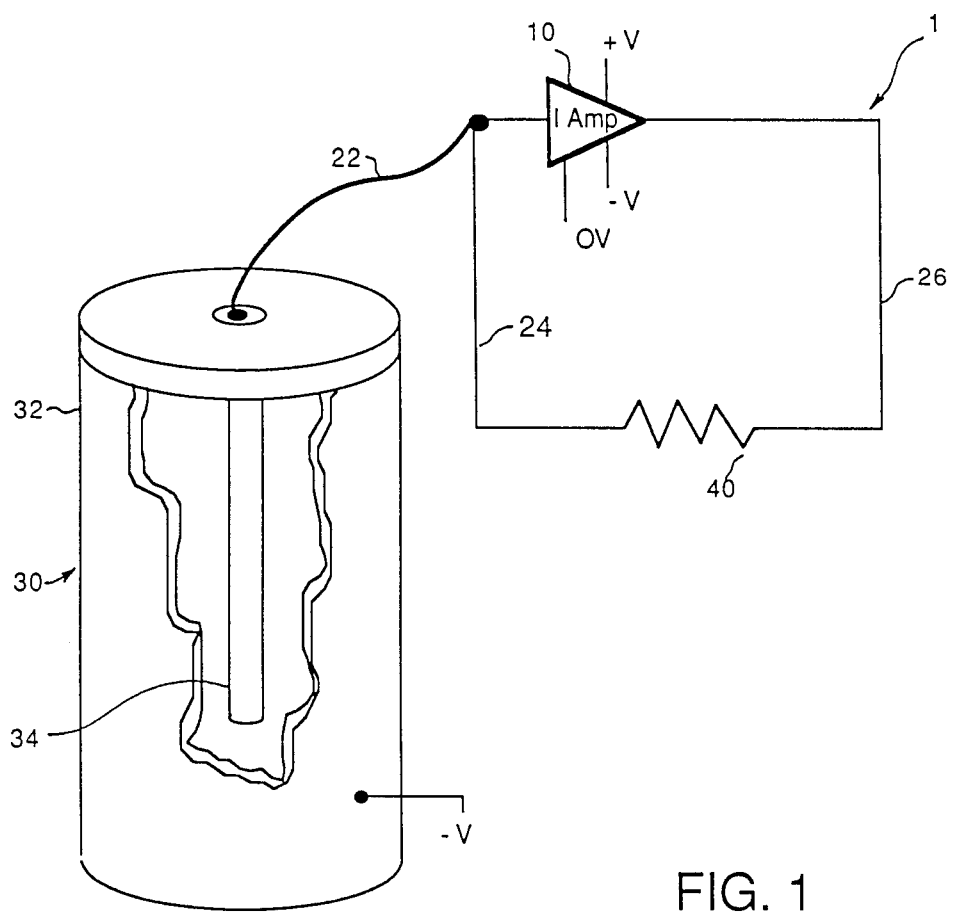
FIG. 1 shows a prior art ionization monitor.

As shown in FIG. 1, an ionization monitor 1 of a type known in the prior art includes a current amplifier 10, a counting chamber 30, and a resistor 40. Chamber 30 includes an electrically conductive wall 32 for enclosing a gas under test and an electrically conductive counting electrode 34 insulated from wall 32 and extending into the volume containing the gas. Wires 22 and 24 connect electrode 34 and one end of resistor 40, respectively, to the input of current amplifier 10. The output of amplifier 10 is connected by wire 26 to the other end of resistor 40. A positive voltage V and a reference voltage O are applied to amplifier 10. A negative voltage $-V$ is applied to amplifier 10 and wall 32 of counter electrode 30.

The operation of this device is as follows: Radiation induces ionization of a gas in chamber 30 and causes a current flow between electrode 34 and wall 32. The extremely low current is amplified by amplifier 10 and fed back through resistor 40 to the input of amplifier 10. The system stabilizes when the current through resistor 40 is equal to the current generated by chamber 30. Since resistor 40 has a very high impedance, the flow of this output current through resistor 40 generates a voltage of sufficient magnitude to provide a measureable indication of current in chamber 30. This current is proportional to the ionization of the radioactive material in the chamber. For an impedance of resistor 40 of $10^{12}$ ohms, ionization monitor 1 typically would provide a voltage of 1.65 volts as an indication of 1000 uCi of tritium from a 2-liter counter chamber.

Obviously, the ionization monitor will be more sensitive if the impedance of resistor 40 is increased. Accordingly, the novel resistor of this invention was developed to easily provide impedances of $10^{17}$–$10^{18}$ ohms and more.

Figure 2:
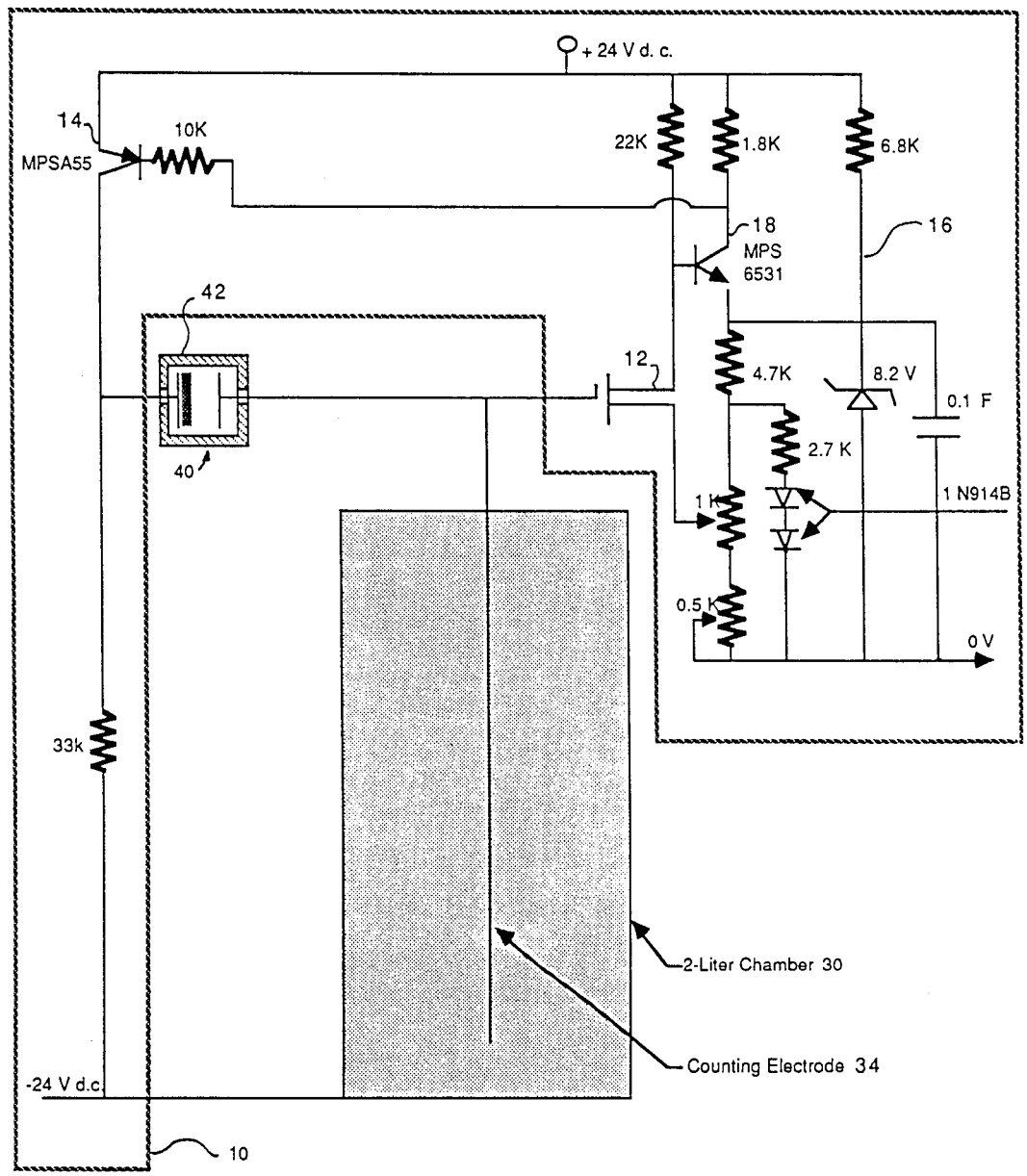
FIG. 2 shows a schematic representation of an ionization monitor including the invention.

FIG. 2 shows an embodiment of the novel resistor of this invention in an ionization monitor, including a schematic of a preferred embodiment of current amplifier 10 including an input FET 12 and an output transistor 14. Circuitry 16 sets the bias level of midstage amplifier 18. Component values for this embodiment are shown in the Figure.

In operation, a current in counter chamber 30 tries to lower the gate voltage (relative to 0 volts) on the input of FET 12, thereby increasing the current at the input of transistor 18 and decreasing the current at the output of transistor 18. The increase in voltage drop between the base and the emitter of output transistor 14 increases the current through transistor 14, raising the voltage at the output of amplifier 10. This voltage is fed back to the input of amplifier 10 through resistor 40 as discussed below.

Figure 3:
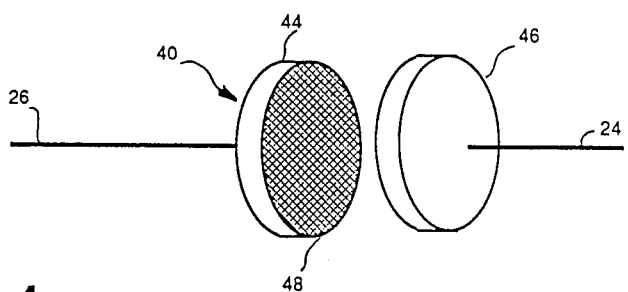
FIG. 3 shows a detail of the resistor of FIG. 2.
Figure 6:
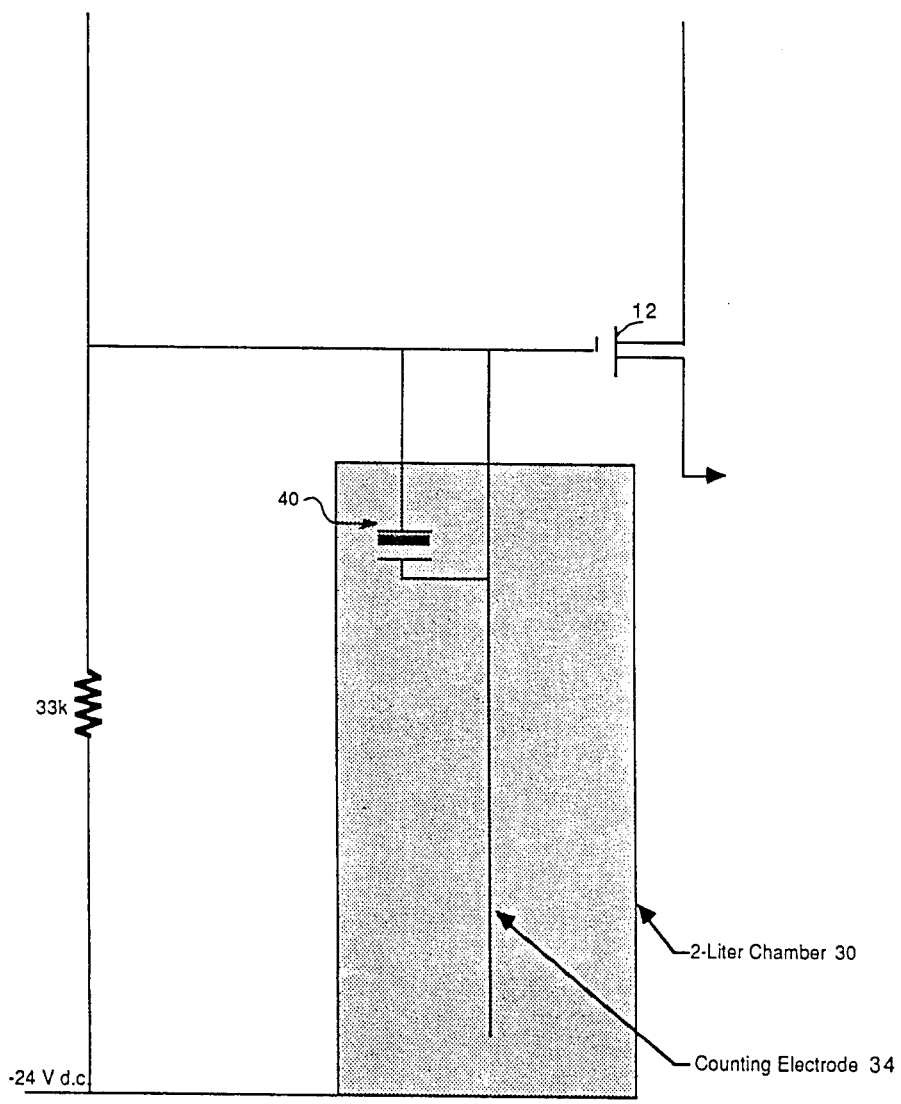
FIG. 6 shows a second placement of the resistor of the invention.

The resistor 40 of FIG. 2 is shown in more detail in FIG. 3 to comprise a pair of electrically conductive opposed plates, each of which may be on the order of 2 cm in diameter and may be made of stainless steel. One plate 44 is connected to the output of amplifier 10 and is coated on the side facing other plate 46 with a weak beta emitter 48 such as carbon-14. Other plate 46 is connected to the input of amplifier 10 and counter electrode 34 as shown in the Figure. Both plates may be sealed within a grounded conductive box 42 or, in the alternative, placed within counter chamber 30 as shown in FIG. 6.

This device functions as a resistor because the increase in voltage difference between the spaced plates causes an increase in the number of ion pairs collected as a result of the betas, or high-energy electrons, emitted from the coated plate. The carbon-14 beta, for example, has an energy of 155 keV. These betas ionize the gas between the plates. Ionization of an atom of nitrogen (the dominant gas in air) requires about 34 eV. Dividing 155 keV by 34 eV reveals that 4558 nitrogen atoms are ionized, producing 4558 ion pairs, or 4558 low-energy electrons. If the spacing between plates 44 and 46 is sufficient (approximately 1 cm) to allow the beta particles emitted by coating 48 to deteriorate before reaching other plate 46, then the positive ions flow to other plate 46 and negative ions flow to coated plate 44 (because plate 44 is positive relative to plate 46). This current caused by the beta particles is proportional to the applied voltage. Therefore, the device functions as a resistor, a linear device with a voltage proportional to current.

Figure 4:
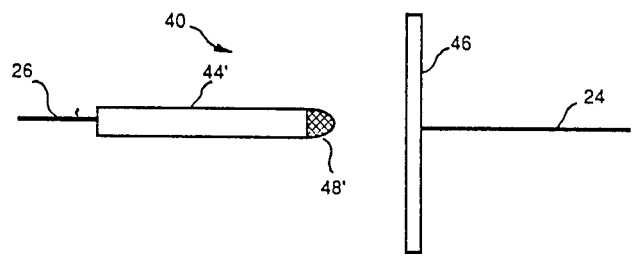
FIG. 4 shows a second embodiment of the resistor of the invention.

An alternative embodiment of the invention is shown in FIG. 4 wherein one plate 44 has been replaced by a probe 44' having a tip coated with beta emitter 48'. In this embodiment the point source of radiation facing other plate 46 serves as a higher impedance resistor resulting in a more sensitive ionization monitor. In addition, this embodiment produces less noise than the embodiment of FIG. 2 because probe 44' provides a more even (less edge effects) source of particles for finite other plate 46, and because there is less capacitance between probe 44' and plate 46 than between plates 44 and 46.

In designing the system, it is important to remember that the number of ion-pairs collected from the resistor 40 must equal the number of ion-pairs formed by the radioactive material sampled in chamber 30. As stated above, as the voltage across resistor 40 increases, the number of ion-pairs collected increases. If an insufficient source of beta is contained in resistor 40, the circuit will never be able to generate the number of pairs necessary to equal the current from chamber 30. If too active a source of beta is contained in resistor 40, the circuit will stabilize at too low a voltage to provide an accurate measurement.

Figure 5:
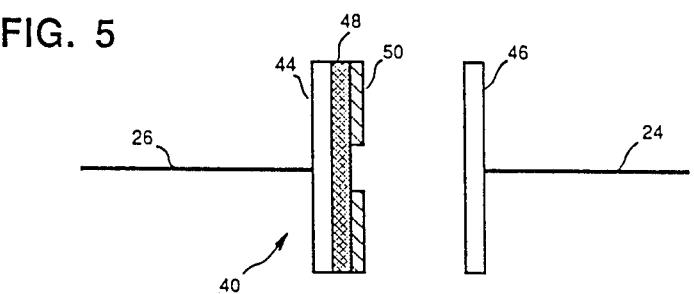
FIG. 5 shows a third embodiment of the resistor.

A third embodiment of the invention is shown in FIG. 5, wherein the resistor of FIG. 3 has added thereto a beta-absorbing disk 50 made of paper or plastic or any other solid material known to block betas and having a centered hole. By reducing the size of the radiation source, this embodiment also has greater sensitivity, as less ionization occurs because of the blocking of a portion of the released betas, meaning that more voltage must be applied to produce the same ion current. An increase in voltage across the device with a constant current means the resistance of the device is increased.

In one example using the circuit of FIG. 2, a carbon-14 source that was uncovered provided a voltage of 4.9 volts (equivalent to $10^{15}$ ohms) with 3.1 uCi of tritium in a 2-liter chamber. A source that was 90% covered provided a voltage of over 15 volts (equivalent to $7 \times 10^{15}$ ohms) with 1.3 uCi of tritium in the chamber. It is contemplated that the value of the resistance, and the resulting sensitivity of the device, could be adjusted by utilizing a plurality of disks 50, each with a different hole diameter.

Carbon-14 is the preferred beta emitter 48 because it is relatively stable (with a half-life of 5730 years) and is relatively weak, allowing weaker particles to decay without affecting the measurement. Of course, other beta emitters may be substituted if they meet the operational requirements of the system.

In use, the system would be calibrated using known amounts of radioactive material in chamber 30. Proportional changes in the voltage measured across resistor 40 would indicate proportional changes in radioactivity in chamber 30.

The particular sizes and equipment discussed above are cited merely to illustrate a particular embodiment of this invention. It is contemplated that the use of the invention may involve components having different sizes and shapes as long as the principle, an ionization monitor including a unique resistor capable of an impedance greater than $10^{15}$ ohms using spaced electrodes, one coated with a weak beta emitter, is followed. It is intended that the scope of the invention be defined by the claims appended hereto.

I claim:

1. In an ionization monitor comprising:
    a counter chamber including
        electrically conductive wall means for containing an ionizable gas and
        an electrically conductive counting electrode extending through and electrically insulated from said wall means;
        whereby radiation-induced ionization of gas in said chamber causes electron flow between said counting electrode and said wall means proportional to the amount of radiation;
    an electrometer circuit having
        a high-impedance input directly connected to said counting electrode means,
        a low-impedance output, and
        100% negative feedback means connected between said output and said input, said feedback means consisting of a high-impedance resistor having one end directly connected to said electrometer input and an other end connected to said output; and
    means for connecting a first dc supply voltage to a first point of said electrometer circuit, a second dc supply voltage to said chamber wall means, and a reference voltage to a reference point of said electrometer circuit;

whereby electron flow through said chamber causes a voltage change between said output and said reference point;
wherein the improvement comprises:
said high impedance resistor comprising
a pair of spaced, electrically conductive electrodes, one of said electrodes defining said one end of said resistor and the other of said electrodes defining the other end of said resistor, said other electrode being coated with a beta emitter; and
an ionizable gas between said electrodes;
whereby an increase in voltage across the resistor causes a current of electron-ion pairs, the impedance of the resistor being greater than $10^{15}$ ohms.

2. The ionization monitor of claim 1 wherein said beta emitter is carbon-14.

3. The ionization monitor of claim 2 wherein said one electrode consists of a metal disk and said other electrode consists of a probe having a tip, said tip being coated to define a point source.

4. The ionization monitor of claim 2 wherein each of said electrodes consist of a metal disk.

5. The ionization monitor of claim 4 further including a beta-absorbing disk between said coating and said one electrode, said beta-absorbing disk having an aperture therein for passage of a portion of the beta particles emitted by said coating.

6. The ionization monitor of claim 2 wherein the spacing between electrodes is between 1 and 2 cm.

7. The ionization monitor of claim 2 wherein said high-impedance resistor is contained within said counter chamber.

* * * * *